(12) United States Patent
Shibata

(10) Patent No.: US 9,187,084 B2
(45) Date of Patent: Nov. 17, 2015

(54) HYBRID VEHICLE

(75) Inventor: Tomoyuki Shibata, Chiryu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/363,041

(22) PCT Filed: Dec. 9, 2011

(86) PCT No.: PCT/JP2011/078593
§ 371 (c)(1),
(2), (4) Date: Jun. 5, 2014

(87) PCT Pub. No.: WO2013/084359
PCT Pub. Date: Jun. 13, 2013

(65) Prior Publication Data
US 2014/0330475 A1 Nov. 6, 2014

(51) Int. Cl.
*B60L 9/00* (2006.01)
*F16H 3/72* (2006.01)
*H02J 7/14* (2006.01)
*B60W 20/00* (2006.01)
*B60K 6/445* (2007.10)
*B60W 10/06* (2006.01)
*B60W 10/08* (2006.01)

(52) U.S. Cl.
CPC ............. *B60W 20/10* (2013.01); *B60K 6/445* (2013.01); *B60W 10/06* (2013.01); *B60W 10/08* (2013.01); *B60W 20/00* (2013.01); *B60W 2710/0644* (2013.01); *B60W 2710/083* (2013.01); *Y02T 10/6239* (2013.01); *Y02T 10/6286* (2013.01); *Y10S 903/93* (2013.01)

(58) Field of Classification Search
USPC .................. 701/22; 475/5; 320/104
See application file for complete search history.

(56) References Cited

U.S. PATENT DOCUMENTS

| | | | |
|---|---|---|---|
| 5,652,486 A * | 7/1997 | Mueller et al. ................. | 318/369 |
| 2003/0137275 A1* | 7/2003 | Suzuki et al. ................. | 320/104 |
| 2004/0249525 A1 | 12/2004 | Okoshi et al. | |
| 2009/0036246 A1* | 2/2009 | Bucknor et al. .................. | 475/5 |
| 2009/0118074 A1* | 5/2009 | Zettel et al. ....................... | 477/3 |
| 2009/0150035 A1* | 6/2009 | Soliman et al. .................. | 701/54 |
| 2009/0227409 A1* | 9/2009 | Ito et al. ............................ | 475/5 |
| 2012/0316711 A1* | 12/2012 | Christian et al. ................ | 701/22 |
| 2014/0330475 A1* | 11/2014 | Shibata ........................... | 701/22 |

FOREIGN PATENT DOCUMENTS

| | | |
|---|---|---|
| JP | 2003-111206 A | 4/2003 |
| JP | 2004-360608 A | 12/2004 |

* cited by examiner

*Primary Examiner* — Thomas G Black
*Assistant Examiner* — Tyler Paige
(74) *Attorney, Agent, or Firm* — Kenyon & Kenyon LLP

(57) ABSTRACT

After satisfaction of an overrun condition that a tentative torque Tm1tmp of a motor overruns a torque limit Tlim1, a torque command Tm1* of the motor is set by limiting the tentative torque Tm1tmp with the torque limit Tlim1. With respect to an engine, the greater between a converted power Pesh and a value 0 is set to a second correction power Pemo2. A requested power Pe* of the engine is recalculated by subtracting a first correction power Pemo1 and the second correction power Pemo2 from the requested power Pe*. The engine is controlled using the recalculated requested power Pe*, while the motor is controlled using the torque command Tm1*.

5 Claims, 8 Drawing Sheets

HYBRID VEHICLE

CROSS-REFERENCE TO RELATED APPLICATIONS

This is a national phase application based on the PCT International Patent Application No. PCT/JP2011/078593 filed on Dec. 9, 2011, the entire contents of which are incorporated herein by reference.

TECHNICAL FIELD

The present invention relates to a hybrid vehicle.

BACKGROUND ART

In a proposed configuration of a hybrid vehicle having: an engine: a generator: a planetary gear unit having a carrier, a sun gear and a ring gear connected with an output shaft of the engine, a rotating shaft of the generator and an output shaft linked to drive wheels; a drive motor having a rotating shaft connected with the ring gear of the planetary gear unit; and a battery capable of transmitting electric power to and from the generator and the drive motor, a torque of the generator is decreased with an increase in temperature of the generator, and a torque of the engine is accordingly decreased with an increase in rotation speed of the generator (for example, Patent Literature 1). In this hybrid vehicle, such control causes the torque of the engine to be sufficiently supported by the torque of the generator and suppresses an excessive increase in rotation speed of the generator.

CITATION LIST

Patent Literature

[PTL 1] Japanese Patent Laid-Open No. 2003-111206

SUMMARY OF INVENTION

In this hybrid vehicle, when a rotation speed-control torque, which is to be output from the generator for controlling the rotation speed of the engine, exceeds a rated torque, the generator is operated with the rated torque, and the output of the engine is reduced according to the excess of the rotation speed-control torque relative to the rated torque. This is expected to suppress an excessive increase in rotation speed of the generator. In the configuration that continues such control for a certain period after its start, when the rotation speed-control torque has a surplus relative to the rated torque, increasing the output torque of the engine causes a relatively significant change in output of the engine in a short time and a relatively significant variation in rotation speed of the engine.

In a hybrid vehicle of the invention, an object is to suppress a variation in rotation speed of an engine after a rotation-adjusting torque for rotating the engine at a target rotation speed overruns a torque limit of a motor.

In order to attain at least part of the above and the other related objects, a hybrid vehicle of the invention has the configurations discussed below.

The present invention is directed to a hybrid vehicle having an engine that is capable of outputting a power for driving, a motor that is capable of inputting and outputting a power from and to an output shaft of the engine, and a battery that is capable of transmitting an electric power to and from the motor. The hybrid vehicle includes a controller that sets a target rotation speed of the engine according to a requested power that is needed to the vehicle, sets a rotation-adjusting torque to rotate the engine at the target rotation speed, and controls the engine and the motor to cause the engine to output a power based on the requested power and cause the motor to output a torque obtained by limiting the rotation-adjusting torque with a torque limit. After satisfaction of an overrun condition that the rotation-adjusting torque overruns the torque limit, the controller controls the engine to output a smaller power than the requested power by a sum of a first power and a second power, which corresponds to a shortage of the torque limit relative to the rotation-adjusting torque, in an overrun state that the rotation-adjusting torque overruns the torque limit. The controller controls the engine to output a smaller power than the requested power by the first power in a non-overrun state that the rotation-adjusting torque does not overrun the torque limit.

The hybrid vehicle of the invention sets the target rotation speed of the engine according to the requested power that is needed to the vehicle, sets the rotation-adjusting torque to rotate the engine at the target rotation speed, and controls the engine and the motor to cause the engine to output the power based on the requested power and cause the motor to output the torque obtained by limiting the rotation-adjusting torque with the torque limit. After satisfaction of the overrun condition that the rotation-adjusting torque overruns the torque limit, in the overrun state that the rotation-adjusting torque overruns the torque limit, the engine is controlled to output the smaller power than the requested power by the sum of the first power and the second power, which corresponds to the shortage of the torque limit relative to the rotation-adjusting torque. In the non-overrun state that the rotation-adjusting torque does not overrun the torque limit, the engine is controlled to output the smaller power than the requested power by the first power. This suppresses a change in output from the engine (power, torque), compared with the configuration that controls the engine to output a smaller power than the requested power by the sum of the first power and the second power, irrespective of the overrun state or the non-overrun state, after satisfaction of the overrun condition. As a result, this suppresses a variation in rotation speed of the engine. This also suppresses an excessive increase in rotation speed of the motor.

In one preferable application of the hybrid vehicle of the invention, after satisfaction of the overrun condition, in the non-overrun state, the controller may control the engine to output the smaller power than the requested power by the first power, before continuation of the non-overrun state for a specified time. Further, the controller may control the engine to make an output power of the engine approach from the smaller power than the requested power by the first power to a smaller power than the requested power by a power corresponding to a surplus of the rotation-adjusting torque relative to the torque limit, after continuation of the non-overrun state for the specified time.

In another preferable application of the hybrid vehicle of the invention, the first power may decrease with continuation of the non-overrun state, after satisfaction of the overrun condition. Further, the first power may be likely to increase with an increase in value obtained by dividing the requested power at a time when the overrun condition is satisfied by the target rotation speed at the time when the overrun condition is satisfied.

Additionally, in the hybrid vehicle of the invention, after satisfaction of the overrun condition, the controller may control the engine to output a corrected power obtained by subtracting the first power and the second power from the requested power in the overrun state and to output a corrected power obtained by subtracting the first power from the requested power in the non-overrun state. Moreover the controller may terminate the control of controlling the engine to output the smaller power than the requested power, when the corrected power becomes equal to or greater than the requested power.

The hybrid vehicle of the invention may further include a planetary gear connected with the output shaft of the engine, a rotating shaft of the motor and a driveshaft linked to an axle, and a second motor that is capable of transmitting an electric power to and from the battery and has a rotating shaft connected with the driveshaft.

DESCRIPTION OF EMBODIMENTS

Some modes of carrying out the invention are discussed below as preferred embodiments.

Figure 1:
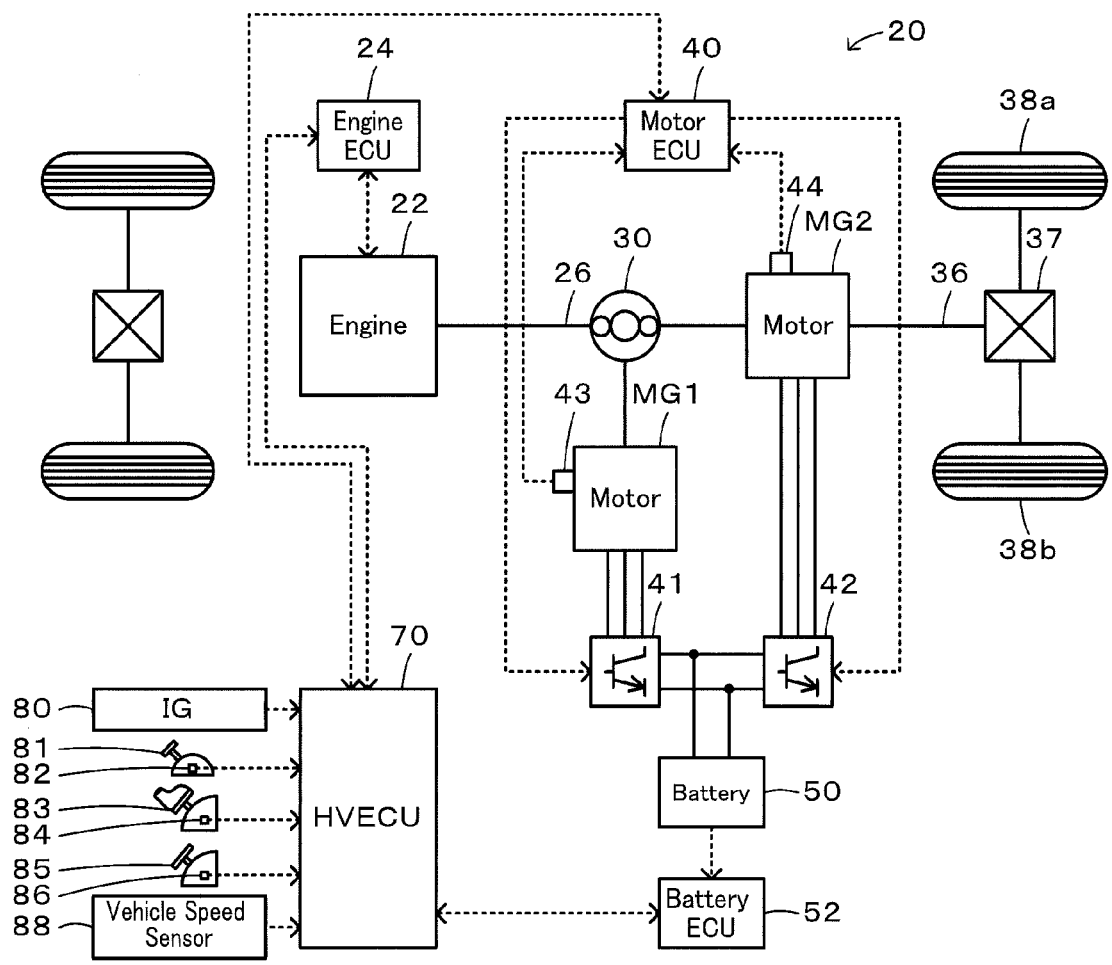
FIG. 1 is a configuration diagram illustrating the general configuration of a hybrid vehicle 20 according to one embodiment of the invention.

FIG. 1 is a configuration diagram illustrating the general configuration of a hybrid vehicle 20 according to one embodiment of the invention. As illustrated, the hybrid vehicle 20 of the embodiment includes an engine 22 which outputs power using, for example, gasoline or light oil as a fuel, an engine electronic control unit (hereinafter referred to as engine ECU) 24 configured to operate and control the engine 22; a planetary gear 30 configured such that a carrier is connected with a crankshaft 26 of the engine 22 and a ring gear is connected with a driveshaft 36 linked to drive wheels 38a and 38b via a differential gear 37; a motor MG1 provided as, for example, a synchronous motor generator and configured to have a rotor connected with a sun gear of the planetary gear 30; a motor MG2 provided as, for example, a synchronous motor generator and configured to have a rotor connected with the driveshaft 36; inverters 41 and 42 arranged to operate the motors MG1 and MG2; a motor electronic control unit (hereinafter referred to as motor ECU) 40 configured to operate and control the motors MG1 and MG2 by switching control of non-illustrated switching elements of the inverters 41 and 42; a battery 50 provided as, for example, a lithium ion secondary battery and configured to transmit electric power to and from the motors MG1 and MG2 via the inverters 41 and 42; a battery electronic control unit (hereinafter referred to as battery ECU) 52 configured to manage the battery 50; and a hybrid electronic control unit (hereinafter referred to as HVECU) 70 configured to control the entire vehicle.

Although not illustrated, the engine ECU 24 is implemented by a CPU-based microprocessor and includes a ROM that stores processing programs, a RAM that temporarily stores data, input-output ports and a communication port other than the CPU. The engine ECU 24 inputs signals via the input port from a variety of sensors that detect the operating conditions of the engine 22: for example, a crank position $\theta cr$ from a crank position sensor that detects the rotating position of the crankshaft 26; a cooling water temperature Tw from a water temperature sensor that detects the temperature of cooling water in the engine 22; a cylinder pressure Pin from a pressure sensor placed in a combustion chamber; a cam position $\theta ca$ from a cam position sensor that detects the rotating position of a cam shaft to open and close an air intake valve and an exhaust valve for air intake and exhaust into and from the combustion chamber; a throttle position TP from a throttle valve position sensor that detects the position of a throttle valve; an intake air flow Qa from an air flow meter attached to an air intake pipe; an intake air temperature Ta from a temperature sensor similarly attached to the air intake pipe; an air-fuel ratio AF from an air-fuel ratio sensor placed in an exhaust system; and an oxygen signal O2 from an oxygen sensor similarly placed in the exhaust system. The engine ECU 24 outputs via the output port a variety of control signals to drive the engine 22: for example, a drive signal to a fuel injection valve; a drive signal to a throttle motor operated to adjust the throttle valve position; a control signal to an ignition coil integrated with an igniter; and a control signal to a variable valve timing mechanism that is capable of varying the open-close timing of the air intake valve. The engine ECU 24 communicates with the HVECU 70 to control the operation of the engine 22 in response to control signals from the HVECU 70 and output data regarding the operating conditions of the engine 22 to the HVECU 70 as necessary. The engine ECU 24 also calculates a rotation speed of the crankshaft 26, i.e., a rotation speed Ne of the engine 22, based on the signal from the non-illustrated crank position sensor attached to the crankshaft 26.

Although not illustrated, the motor ECU 40 is implemented by a CPU-based microprocessor and includes a ROM that stores processing programs, a RAM that temporarily stores data, input-output ports and a communication port other than the CPU. The motor ECU 40 inputs via the input port signals required to drive and control the motors MG1 and MG2: for example, rotational positions $\theta m1$ and $\theta m2$ from rotational position detection sensors 43 and 44 that detect the rotational positions of rotators of the motors MG1 and MG2; and phase currents to be applied to the motors MG1 and MG2, which are detected by non-illustrated current sensors. The motor ECU 40 outputs via the output port, for example, switching control signals to non-illustrated switching elements of the inverters 41 and 42. The motor ECU 40 communicates with the HVECU 70 to drive and control the motors MG1 and MG2 in response to control signals from the HVECU 70 and output data regarding the operating conditions of the motors MG1 and MG2 to the HVECU 70 as necessary. The motor ECU 40 also calculates rotation angular velocities ωm1 and ωm2 and rotation speeds Nm1 and Nm2 of the motors MG1 and MG2, based on the rotational positions θm1 and θm2 of the rotors of the motors MG1 and MG2 from the rotational position detection sensors 43 and 44.

Although not illustrated, the battery ECU 52 is implemented by a CPU-based microprocessor and includes a ROM that stores processing programs, a RAM that temporarily stores data, input-output ports and a communication port other than the CPU. The battery ECU 52 inputs signals required to manage the battery 50: for example, an inter-terminal voltage Vb from a non-illustrated voltage sensor placed between the terminals of the battery 50; a charge-discharge current Ib from a non-illustrated current sensor attached to a power line connected to the output terminal of the battery 50; and a battery temperature Tb from a non-illustrated temperature sensor attached to the battery 50. The battery ECU 52 sends data regarding the conditions of the battery 50 as necessary to the HVECU 70 by communication. For the purpose of managing the battery 50, the battery ECU 52 also calculates a state of charge SOC, which is a ratio of the power capacity dischargeable from the battery 50 to the entire capacity, based on an integral value of the charge-discharge current Ib detected by the current sensor, while calculating input and output limits Win and Wout as maximum allowable powers to be charged in and discharged from the battery 50, based on the calculated state of charge SOC and the battery temperature Tb. A specific procedure of determining the input and output limits Win and Wout of the battery 50 may set base values of the input and output limits Win and Wout based on the battery temperature Tb, set an output limit correction coefficient and an input limit correction coefficient based on the state of charge SOC of the battery 50 and multiply the set base values of the input and output limits Win and Wout by the correction coefficients.

Although not illustrated, the HVECU 70 is implemented by a CPU-based microprocessor and includes a ROM that stores processing programs, a RAM that temporarily stores data, input-output ports and a communication port other than the CPU. The HVECU 70 inputs via the input port, for example, an ignition signal from an ignition switch 80, a gearshift position SP from a gearshift position sensor 82 that detects the operational position of a gearshift lever 81, an accelerator opening Acc from an accelerator pedal position sensor 84 that detects the depression amount of the accelerator pedal 83, a brake pedal position BP from a brake pedal position sensor 86 that detects the depression amount of the brake pedal 85 and a vehicle speed V from a vehicle speed sensor 88. The HVECU 70 is connected with the engine ECU 24, the motor ECU 40, and the battery ECU 52 via the communication port to transmit the variety of control signals and data to and from the engine ECU 24, the motor ECU 40, and the battery ECU 52 as described above. The gearshift position SP includes, for example, a parking position, a neutral position, a drive position for forward driving and a reverse position for reverse driving.

The hybrid vehicle 20 of the embodiment configured as described above calculates a requested torque Tr* to be output to the driveshaft 36 based on the an accelerator opening Acc corresponding to the driver's depression amount of the accelerator pedal and the vehicle speed V, and controls the operations of the engine 22, the motor MG1 and the motor MG2 to output a required power corresponding to this requested torque Tr* to the driveshaft 36. The operation controls of the engine 22, the motor MG1 and the motor MG2 include: a torque conversion operation mode that controls the operation of the engine 22 to cause the power corresponding to the required power to be output from the engine 22, while driving and controlling the motors MG1 and MG2 to cause all the power output from the engine 22 to be subjected to torque conversion by the planetary gear 30, the motor MG1 and the motor MG2 and to be output to the driveshaft 36; a charge-discharge operation mode that controls the operation of the engine 22 to cause the total power corresponding to the sum of the required power and the electric power required for charging or discharging the battery 50 to be output from the engine 22, while driving and controlling the motor MG1 and the motor MG2 to cause all or part of the power output from the engine 22 to be subjected to torque conversion by the planetary gear 30, the motor MG1 and the motor MG2 and to be output to the driveshaft 36, accompanied with charging or discharging the battery 50; and a motor operation mode that stops the operation of the engine 22, while driving and controlling the motor MG2 to cause the power corresponding to the required power to be output to the driveshaft 36. The torque conversion operation mode and the charge-discharge operation mode are both the mode of controlling the engine 22 and the motors MG1 and MG2 to cause the required power to be output to the driveshaft 36, accompanied with the operation of the engine 22 and have no substantial difference in control. Hereinafter these two modes are collectively called engine operation mode.

Figure 2:
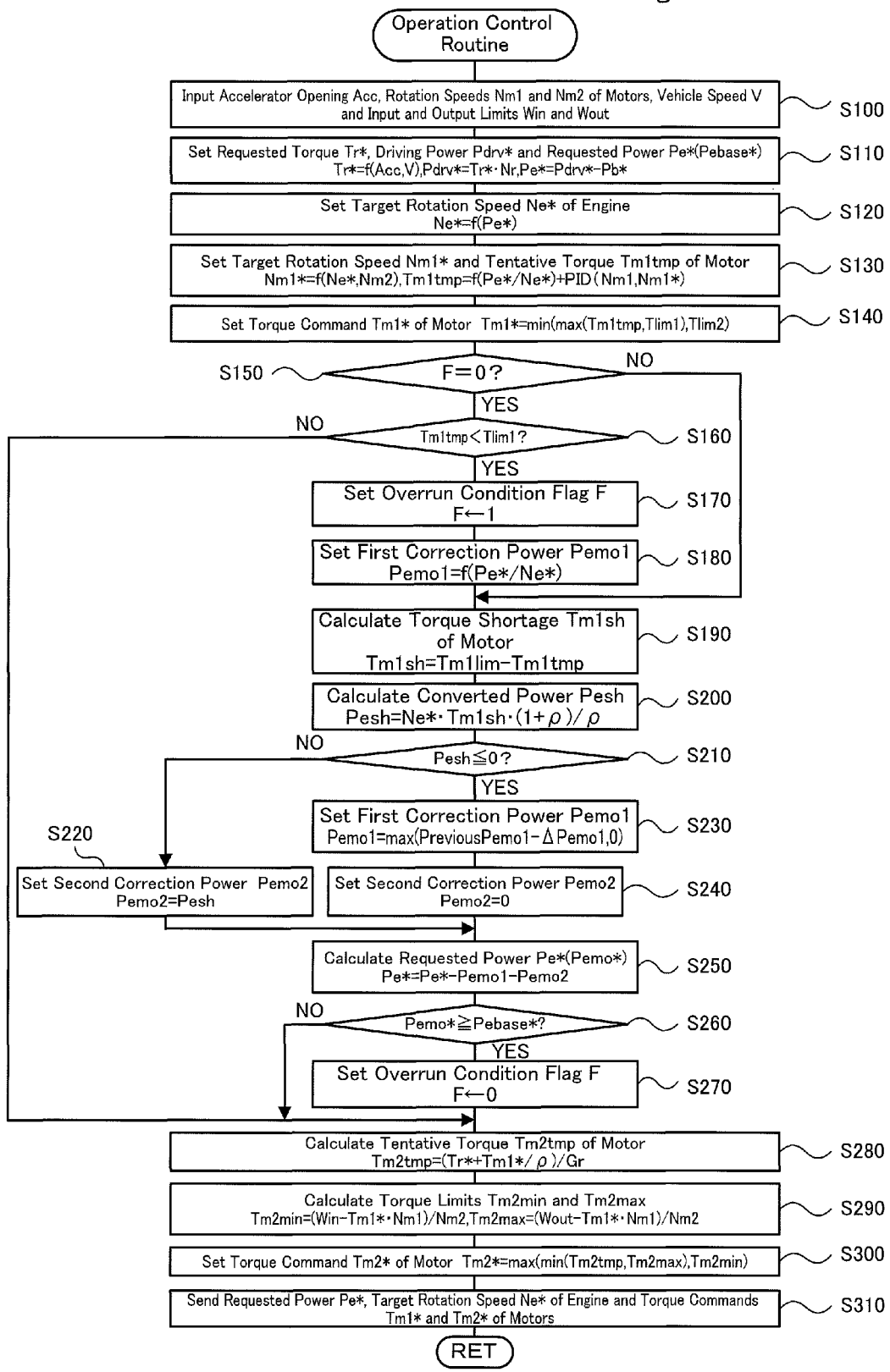
FIG. 2 is a flowchart showing an exemplary operation control routine performed by an HVECU 70 of the embodiment.

The following describes the operations of the hybrid vehicle 20 of the embodiment having the above configuration. FIG. 2 is a flowchart showing an exemplary operation control routine performed by the HVECU 70 of the embodiment. This routine is repeatedly performed at predetermined time intervals (for example, several msec).

When the operation control routine is triggered, the HVECU 70 first inputs data required for control, for example, the accelerator opening Acc from the accelerator pedal position 84, the vehicle speed V from the vehicle speed sensor 88, the rotation speeds Nm1 and Nm2 of the motors MG1 and MG2 and the input and output limits Win and Wout of the battery 50 (step S100). The rotation speeds Nm1 and Nm2 of the motors MG1 and MG2 herein are calculated from the rotational positions θm1 and θm2 of the respective rotors of the motors MG1 and MG2 detected by the rotational position detection sensors 43 and 44 and are input by communication from the motor ECU 40. The input and output limits Win and Wout of the battery 50 are set based on the battery temperature Tb of the battery 50 and the state of charge SOC of the battery 50 and are input by communication from the battery ECU 52.

Figure 3:
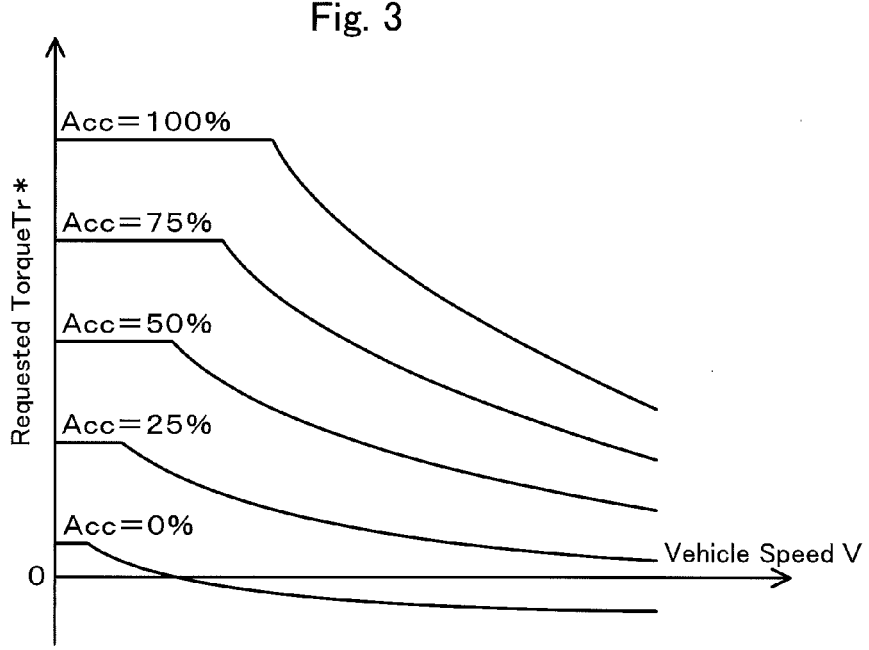
FIG. 3 is a diagram illustrating an example of a requested torque setting map.

After the data input, the procedure sets a requested torque Tr* to be output to the driveshaft 36 based on the input accelerator opening Acc and vehicle speed V, multiplies the set requested torque Tr* by a rotation speed Nr of the driveshaft 36 to calculate a driving power Pdrv* needed for driving, and subtracts a requested charge/discharge power Pb* of the battery 50 (taking a positive value in the discharging state of the battery 50) obtained according to the state of charge SOC of the battery 50 from the driving power Pdrv* to calculate a requested power Pe* as a power needed to the vehicle (power to be output from the engine 22) (step S110). A specific procedure of setting the requested torque Tr* according to the embodiment provides and stores in advance a relationship among the accelerator opening Acc, the vehicle speed V and the requested torque Tr* as a requested torque setting map in a non-illustrated ROM and reads the requested torque Tr* corresponding to the given accelerator opening Acc and vehicle speed V from the stored map. One example of the requested torque setting map is illustrated in FIG. 3. The rotation speed Nr of the driveshaft 36 may be, for example, a rotation speed obtained by multiplying the rotation speed Nm2 of the motor MG2 or the vehicle speed V by a conversion factor. In the description below, the requested power Pe* calculated at this step S110 may be called pre-correction requested power Pebase*.

Figure 4:
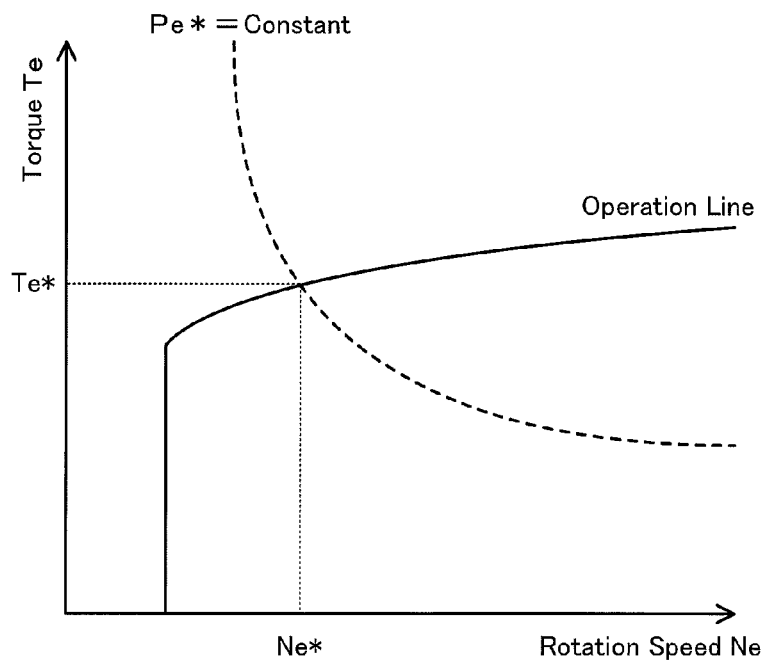
FIG. 4 is a diagram illustrating one example of an operation line of an engine 22 and a process of setting a target rotation speed Ne*.

The procedure subsequently sets a target rotation speed Ne* as a rotation speed at a target operation point where the engine 22 is to be operated, based on the requested power Pe* and an operation line (for example, optimum fuel consumption operation line) provided as a relationship between rotation speed and torque of the engine 22 that ensures output of the requested power Pe* from the engine 22 with high efficiency (step S120). FIG. 4 is a diagram illustrating one example of the operation line of the engine 22 and a process of setting the target rotation speed Ne*. As illustrated, the target rotation speed Ne* of the engine 22 is specifiable as the intersection of the operation line of the engine 22 and a curve where the requested power Pe* is constant.

Figure 5:
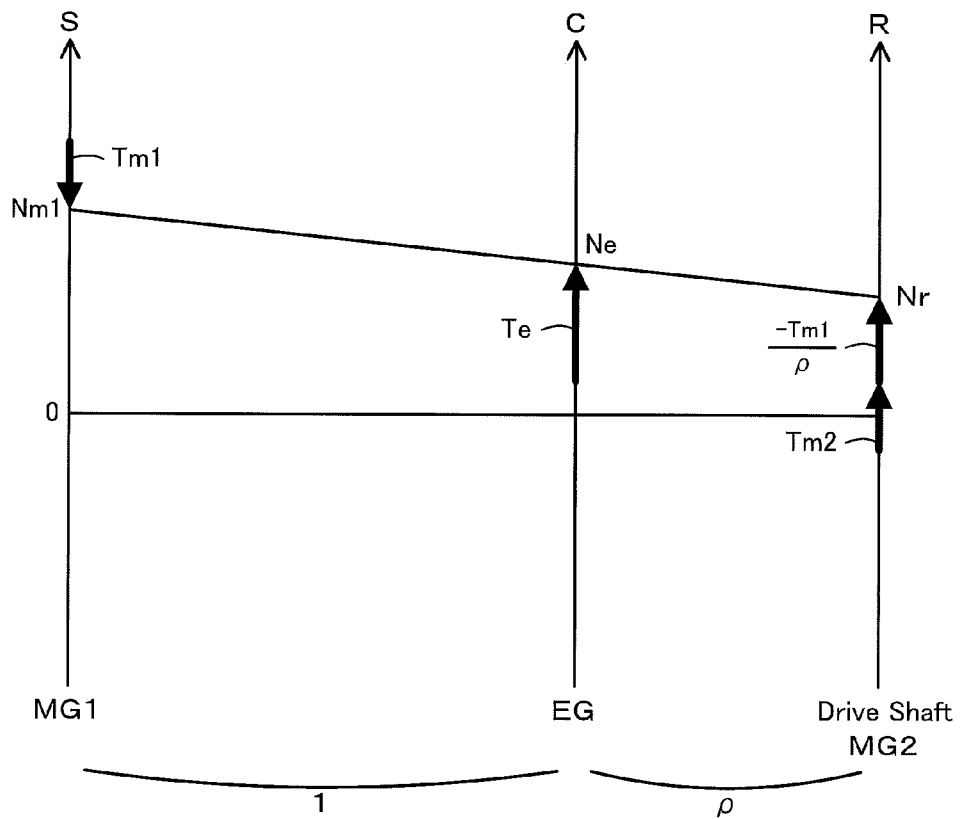
FIG. 5 is a diagram illustrating one example of a collinear graph representing a dynamic relationship between rotation speed and torque with respect to rotational elements of a planetary gear 30 during driving with outputting power from the engine 22.

The procedure then calculates a target rotation speed Nm1* of the motor MG1 according to Expression (1) given below using the set target rotation speed Ne* of the engine 22, the rotation speed Nm2 of the motor MG2 and a gear ratio ρ of the planetary gear 30 (number of teeth of the sun gear/number of teeth of the ring gear), and calculates a tentative torque Tm1tmp as a tentative value of torque to be output from the motor MG1 according to Expression (2) given below using the requested power Pe*, the target rotation speed Ne*, the gear ratio ρ of the planetary gear 30, the target rotation speed Nm1* and the rotation speed Nm1 of the motor MG1 (step S130). Expression (1) is a dynamic relational expression with respect to the rotational elements of the planetary gear 30. FIG. 5 is a diagram illustrating one example of a collinear graph representing a dynamic relationship between rotation speed and torque with respect to the rotational elements of the planetary gear 30 during driving with outputting power from the engine 22. In the illustration, an S axis on the left shows the rotation speed of the sun gear that is equal to the rotation speed Nm1 of the motor MG1; a C axis shows the rotation speed of the carrier that is equal to the rotation speed Ne of the engine 22; and an R axis shows the rotation speed Nr of the driveshaft 36 that is equal to the rotation speed Nm2 of the motor MG2. Two thick line arrows on the R axis represent a torque (−Tm1/ρ) output from the motor MG1 and applied to the driveshaft 36 via the planetary gear 30 and a torque Tm2 output from the motor MG2 to the driveshaft 36. In the illustration of this embodiment, the upward arrow represents a positive torque and the downward arrow represents a negative torque. Expression (1) is readily introduced by using this collinear graph. Expression (2) is a relationship expression of feedback control to make the rotation speed Nm1 of the motor MG1 equal to the target rotation speed Nm1* (make the rotation speed Ne of the engine 22 equal to the target rotation speed Ne*). In Expression (2), the first term on the right side is a feed forward term; the second term on the right side is a feedback proportional; and the third term on the right side is a feedback integral term. The first term on the right side denotes a torque to receive a torque output from the engine 22 and applied to the sun gear of the planetary gear 30 via the crankshaft 26 and the carrier of the planetary gear 30; "k1" of the second term on the right side represents a gain of the proportional; and "k2" of the third term on the right side represents a gain of the integral term. During driving with outputting power from the engine 22, the motor MG1 uses the power from the engine 22 to generate electric power (downward arrow on the S axis in FIG. 5), so that the tentative torque Tm1tmp of the motor MG1 is generally a negative torque (torque in the direction of reducing the rotation speed Ne of the engine 22).

$$Nm1^* = Ne^* \cdot (1+\rho)/\rho - Nm2/\rho \tag{1}$$

$$Tm1tmp = -\rho \cdot Pe^*/((1+\rho) \cdot Ne^*) + k1 \cdot (Nm1^* - Nm1) + k2 \cdot \int (Nm1^* - Nm1) dt \tag{2}$$

After setting the tentative torque Tm1tmp of the motor MG1, the procedure limits the tentative torque Tm1tmp with a torque limit Tlim1 (<0) and a torque limit Tlim2 (>0) according to Expression (3), so as to set a torque command Tm1* as a torque to be output from the motor MG1 (step S140). The torque limits Tlim1 and Tlim2 represent a negative value and a positive value of rated maximum torque at the rotation speed Nm1 of the motor MG1.

$$Tm1^* = \min(\max(Tm1tmp, Tlim1), Tlim2) \tag{3}$$

The procedure subsequently checks the value of an overrun condition flag F, which is set to a value 0 as an initial value and is set to a value 1 upon satisfaction of an overrun condition that the tentative torque Tm1tmp of the motor MG1 overruns the torque limit Tlim1 (becomes smaller than the torque limit Tlim1) (step S150). When the value of the overrun condition flag F is equal to 0, the tentative torque Tm1tmp of the motor MG1 is compared with the torque limit Tlim1 (step S160). The processing of step S150 determines whether the present state is after satisfaction of the overrun condition, and the processing of step S160 determines whether the overrun condition is satisfied. The overrun condition is likely to be satisfied, when an output from the engine 22 (power, torque) is likely to become greater than a requested value due to the high density of the air (air density) taken into the engine 22, for example, in the state of low intake air temperature Ta of the engine 22 or in the state of high atmospheric pressure Pa, or, when a large output is requested to the engine 22, for example, in the state that the driver steps down the accelerator pedal 83 during driving on an upward slope.

When the value of the overrun condition flag F is equal to 0 at step S150 and when the tentative torque Tm1tmp of the motor MG1 is equal to or greater than the torque limit Tlim1 at step S160, it is determined that the present state is not after satisfaction of the overrun condition and that the overrun condition is not satisfied. The procedure then calculates a tentative torque Tm2tmp as a tentative value of torque to be output from the motor MG2 by adding the division of the torque command Tm1* of the motor MG1 by the gear ratio ρ of the planetary gear 30 to the requested torque Tr* according to Expression (4) given below (step S280). The procedure also calculates torque limits Tm2min and Tm2max as upper and lower limits of torque allowable to be output from the motor MG2 by dividing the difference between the input limit Win or the output limit Wout of the battery 50 and the consumed electric power (generated electric power) of the motor MG1, which is obtained by multiplying the torque command Tm1* of the motor MG1 by the rotation speed Nm1, by the rotation speed Nm2 of the motor MG2 according to Expressions (5) and (6) (step S290). The procedure limits the tentative torque Tm2tmp with the torque limits Tm2min and Tm2max according to Expression (7), so as to set a torque command Tm2* as a torque to be output from the motor MG2 (step S300). Expression (4) is readily introduced from the collinear graph of FIG. 5.

$$Tm2tmp = Tr^* + Tm1^*/\rho \tag{4}$$

$$Tm2\min = (Win - Tm1^* \cdot Nm1)/Nm2 \tag{5}$$

$$Tm2\text{max}=(W\text{out}-Tm1^*\cdot Nm1)/Nm2 \tag{6}$$

$$Tm2^*=\max(\min(Tm2tmp, Tm2\text{max}), Tm2\text{min}) \tag{7}$$

After setting the requested power Pe*, the target rotation speed Ne* of the engine 22 and the torque commands Tm1* and Tm2* of the motors MG1 and MG2, the procedure sends the requested power Pe* and the target rotation speed Ne* of the engine 22 to the engine ECU 24 and sends the torque commands Tm1* and Tm2* of the motors MG1 and MG2 to the motor ECU 40 (step S310) and terminates this routine. When receiving the requested power Pe* and the target rotation speed Ne* of the engine 22, the engine ECU 24 divides the requested power Pe* by the target rotation speed Ne* of the engine 22 to calculate a target torque Te* of the engine 22 and performs intake air flow control, fuel injection control and ignition control of the engine 22 to operate the engine 22 at an operation point (target operation point) defined by the target rotation speed Ne* and the target torque Te*. When receiving the torque commands Tm1* and Tm2* of the motors MG1 and MG2, the motor ECU 40 performs switching control of the switching elements of the inverters 41 and 42 to operate the motors MG1 and MG2 with the torque commands Tm1* and Tm2*.

Figure 6:
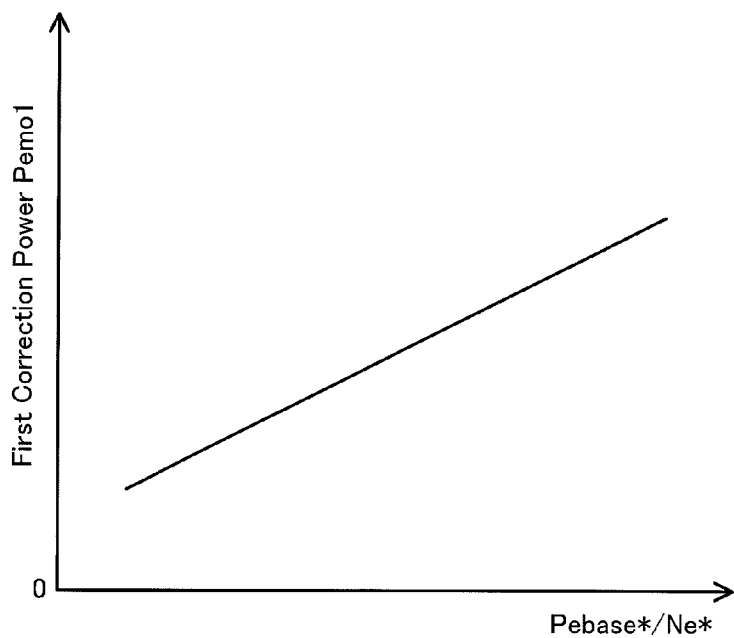
FIG. 6 is a diagram illustrating one example of a first correction power setting map.

When the value of the overrun condition flag F is equal to 0 at step S150 and when the tentative torque Tm1tmp of the motor MG1 is less than the torque limit Tlim1 at step S160, it is determined that the overrun condition is satisfied. The procedure then sets the overrun condition flag F to the value 1 (step S170) and sets a first correction power Pemo1 used to correct the pre-correction requested power Pebase* (requested power Pe* calculated at step S110) (step S180). A specific procedure of setting the first correction power Pemo1 according to the embodiment provides and stores in advance a relationship between the first correction power Pemo1 and a value obtained by dividing the pre-correction requested power Pebase* at the time of satisfaction of the overrun condition by the target rotation speed Ne* of the engine 22 at the time of satisfaction of the overrun condition (i.e., target torque Te* of the engine 22 at the time of satisfaction of the overrun condition) as a first correction power setting map into the non-illustrated ROM and reads and sets the first correction power Pemo1 corresponding to the given pre-correction requested power Pebase* and target rotation speed Ne* from the stored map. One example of the first correction power setting map is illustrated in FIG. 6. As illustrated, the first correction power Pemo1 is set to have a tendency to increase with an increase in target torque Te* (=Pe*/Ne*) of the engine 22 in a range of greater than the value 0. This is attributed to the reason that the rotation speed Nm1 of the motor MG1 is likely to increase with an increase in target torque Te* of the engine 22, so that there is a need to more significantly limit the requested power Pe* (target torque Te*) with an increase in target torque Te*, in order to suppress an excessive increase in rotation speed Nm1 of the motor MG1.

After execution of the processing of steps S170 and S180 or when the value of the overrun condition flag F is equal to 1 at step S150, the procedure subsequently subtracts the tentative torque Tm1tmp of the motor MG1 from the torque limit Tlim1 of the motor MG1 to calculate a torque shortage Tm1sh as a shortage of the torque limit Tlim1 (=Tm1*) of the motor MG1 relative to the tentative torque Tm1tmp (excess of the tentative torque Tm1tmp relative to the torque limit Tlim1) (step S190) and calculates a converted power Pesh according to Expression (8) given below using the calculated torque shortage Tm1sh, the target rotation speed Ne* of the engine 22 and the gear ratio ρ of the planetary gear 30 (step S200). The converted power Pesh is a value obtained by converting the torque shortage Tm1sh of the motor MG1 into a torque of the crankshaft 26 of the engine 22 and further converting the converted torque into a power. Expression (8) is readily introduced from the collinear graph of FIG. 5. This converted power Pesh has the same sign as that of the torque shortage Tm1sh. In other words, when the torque shortage Tm1sh is greater than the value 0 (i.e., when the tentative torque Tm1tmp overruns the torque limit Tlim1), the converted power Pesh is greater than the value 0. When the torque shortage Tm1sh is equal to or less than the value 0 (i.e., when the tentative torque Tm1tmp has a surplus relative to the torque limit Tlim1), on the other hand, the converted power Pesh is equal to or less than the value 0.

$$Pesh=Ne^*\cdot Tm1sh\cdot(1+\rho)/\rho \tag{8}$$

After calculation of the converted power Pesh, the procedure compares the calculated converted power Pesh with a value 0 (step S210). When the converted power Pesh is greater than the value 0, the procedure sets the converted power Pesh to a second correction power Pemo2 used to correct the pre-correction requested power Pebase* (requested power Pe* calculated at step S110) (step S220) and recalculates the requested power Pe* of the engine 22 by subtracting the first correction power Pemo1 and the second correction power Pemo2 from the pre-correction requested power Pebase* (step S250). In the description hereinafter, the requested power Pe* after the recalculation may be called post-correction requested power Pemo*. As the result of the processing of steps S220 and S250, when the present state is after satisfaction of the overrun condition and when the converted power Pesh is greater than the value 0 (i.e., when the tentative torque Tm1tmp overruns the torque limit Tlim1), for example, immediately after satisfaction of the overrun condition, the post-correction requested power Pemo* is smaller than the pre-correction requested power Pebase* by the sum of the first correction power Pemo1 and the second correction power Pemo2 (converted power Pesh).

The procedure subsequently compares the post-correction requested power Pemo* (requested power Pe* recalculated at step S250) with the pre-correction requested power Pebase* (requested power Pe* calculated at step S110) (step S260). When the post-correction requested power Pemo* is less than the pre-correction requested power Pebase*, the procedure keeps the overrun condition flag F at the value 1, performs the processing of steps S280 to S310 and then terminates this routine.

When the present state is after satisfaction of the overrun condition and when the converted power Pesh is greater than the value 0 (i.e., when the tentative torque Tm1tmp overruns the torque limit Tlim1), such control causes a smaller power than the pre-correction requested power Pebase* by the sum of the first correction power Pemo1 and the second correction power Pemo2 (converted power Pesh) to be output from the engine 22 as the post-correction requested power Pemo*. More specifically, by taking into account no change in target rotation speed Ne* between the pre-correction requested power Pebase* and the post-correction requested power Pemo*, the engine 22 is controlled to output a smaller torque than a pre-correction power-corresponding torque (Pebase*/Ne*) corresponding to the pre-correction requested power Pebase* by a correction power-corresponding torque ((Pemo1+Pemo2)/Ne*) corresponding to the sum of the first correction power Pemo1 and the second correction power Pemo2, and the motor MG1 is controlled to output a torque corresponding to the torque limit Tlim1. This suppresses an excessive increase of the rotation speed Nm1 of the motor MG1.

When the converted power Pesh is equal to or less than the value 0 at step S210, on the other hand, the procedure sets the greater between the value 0 and a value obtained by subtracting a predetermined value ΔPemo1 from the previous first correction power (previous Pemo1) to the first correction power Pemo1 (step S230), sets the value 0 to the second correction power Pemo2 (step S240), and subtracts the first correction power Pemo1 and the second correction power Pemo2 from the pre-correction requested power Pebase* to calculate the post-correction requested power Pemo* (step S250). The predetermined value ΔPemo1 defines a degree of decrease in first correction power Pemo1 per unit time in the state that the converted power Pesh is equal to or less than the value 0, and is specifiable in such a range that a change in requested power Pe* and thus a variation in rotation speed Ne of the engine 22 are expected not to give the driver a feeling of strangeness. As the result of the processing of steps S230 to S250, when the present state is after satisfaction of the overrun condition and when the converted power Pesh is equal to or less than the value 0 (i.e., when the tentative torque Tm1tmp has a surplus relative to the torque limit Tlim1), the post-correction requested power Pemo* is smaller than the pre-correction requested power Pebase* by the sum of the first correction power Pemo1, which gradually decreases with continuation of the state that the converted power Pesh is equal to or less than the value 0, and the second correction power Pemo2, which is set to the value 0.

The procedure compares the post-correction requested power Pemo* with the pre-correction requested power Pebase* (step S260). When the post-correction requested power Pemo* is less than the pre-correction requested power Pebase*, the procedure keeps the overrun condition flag F at the value 1, performs the processing of steps S280 to S310 and terminates this routine.

When the present state is after satisfaction of the overrun condition and when the converted power Pesh is equal to or less than the value 0 (i.e., when the tentative torque Tm1tmp has a surplus relative to the torque limit Tlim1), such control causes a smaller power than the pre-correction requested power Pebase* by the first correction power Pemo1 to be output from the engine 22 as the post-correction requested power Pemo*. More specifically, by taking into account no change in target rotation speed Ne* between the pre-correction requested power Pebase* and the post-correction requested power Pemo*, the engine 22 is controlled to output a smaller torque than a pre-correction power-corresponding torque (Pebase*/Ne*) corresponding to the pre-correction requested power Pebase* by a correction power-corresponding torque (Pemo1/Ne*) corresponding to the first correction power Pemo1, and the motor MG1 is controlled to output a torque corresponding to the tentative torque Tm1tmp.

As a comparative example, it is assumed that the converted power Pesh corresponding to the torque shortage Tm1sh is used as the second correction power Pemo2 after satisfaction of the overrun condition. In this comparative example, after satisfaction of the overrun condition, whether the tentative torque Tm1tmp of the motor MG1 overruns the torque limit Tlim1 (when the torque limit Tlim1 is set to the torque command Tm1*) or the tentative torque Tm1tmp of the motor MG1 has a surplus relative to the torque limit Tlim1 (when the tentative torque Tm1tmp is set to the torque command Tm1*), the converted power Pesh corresponding to the shortage or the surplus is used as the second correction power Pemo2. The post-correction requested power Pemo* is accordingly changed to decrease or increase relative to a power (Pebase*− Pemo1) smaller than the pre-correction requested power Pebase* by the first correction power Pemo1 according to a variation in torque command Tm1* of the motor MG1. In some cases, the post-correction requested power Pemo* may have a relatively significant change, which may lead to a relatively large variation in torque Te of the engine 22 and a relatively large variation in rotation speed Ne of the engine 22. In the embodiment, on the other hand, after satisfaction of the overrun condition, the converted power Pesh is used as the second correction power Pemo2 when the tentative torque Tm1tmp of the motor MG1 overruns the torque limit Tlim1, while the value 0 is used as the second correction power Pemo2 when the tentative torque Tm1tmp has a surplus relative to the torque limit Tlim1. The post-correction requested power Pemo* is accordingly changed to only decrease relative to the power (Pebase*−Pemo1) according to a variation in torque command Tm1* of the motor MG1. This suppresses a change in post-correction requested power Pemo*, thereby suppressing a variation in torque Te of the engine 22 and a variation in rotation speed Ne of the engine 22. As described above, when the tentative torque Tm1tmp of the motor MG1 overruns the torque limit Tlim1, the converted power Pesh is used as the second correction power Pemo2, and the post-correction requested power Pemo* is calculated by subtracting the sum of the first correction power Pemo1 and the second correction power Pemo2 from the pre-correction requested power Pebase*. This suppresses an excessive increase in rotation speed Nm1 of the motor MG1.

During repetition of this routine, when it is determined at step S260 that the post-correction requested power Pemo* is equal to or greater than the pre-correction requested power Pebase*, the procedure sets the overrun condition flag F to the value 0 (step S270), performs the processing of steps S280 to S310 and terminates this routine. According to the embodiment, the first correction power Pemo1 and the second correction power Pemo2 are both equal to or greater than the value 0, so that the first correction power Pemo1 is gradually decreased with continuation of the state that the converted power Pesh is equal to or less than the value 0. When both the first correction power Pemo1 and the second correction power Pemo2 become equal to the value 0, it is determined at step S260 that the post-correction requested power Pemo* is equal to or greater than the pre-correction requested power Pebase*.

Figure 7:
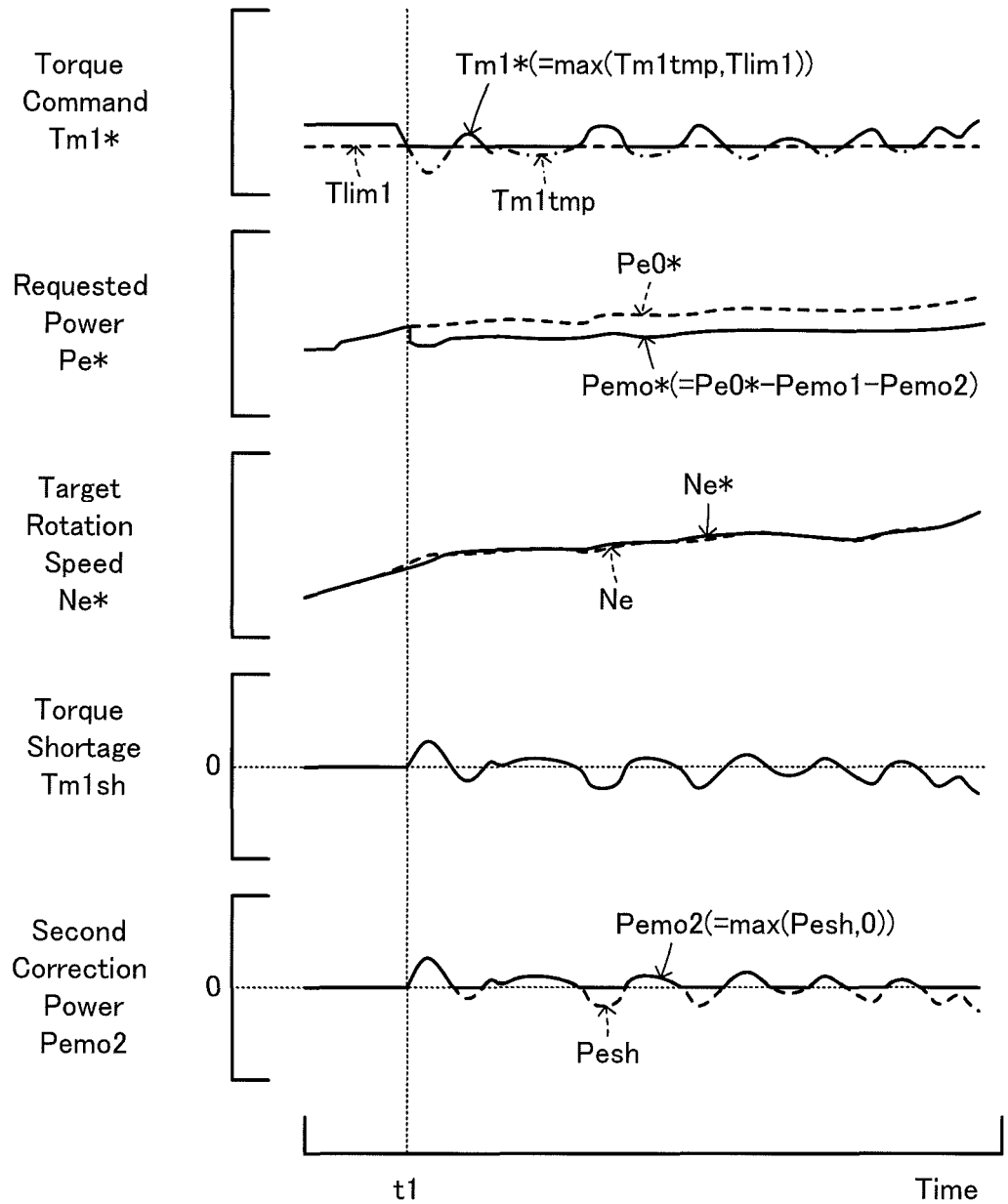
FIG. 7 is a diagram illustrating one example of time changes in torque command Tm1* of a motor MG1, requested power Pe*, target rotation speed Ne* of the engine 22, torque shortage Tm1sh, and second correction power Pemo2 when an overrun condition is satisfied.

FIG. 7 is a diagram illustrating one example of time changes in torque command Tm1* of the motor MG1, requested power Pe*, target rotation speed Ne* of the engine 22, torque shortage Tm1sh, and second correction power Pemo2 when the overrun condition is satisfied. According to the embodiment, as illustrated, after a time t1 when the tentative torque Tm1tmp of the motor MG1 becomes smaller than the torque limit Tlim1 and the overrun condition is satisfied, the greater between the converted power Pesh corresponding to the torque shortage Tm1sh and the value 0 is set to the second correction power Pemo2. The engine 22 is controlled using a smaller power than the pre-correction requested power Pebase* by the sum of the first correction power Pemo1 and the second correction power Pemo2, as the post-correction requested power Pemo*. This more effectively suppresses a change in requested power Pe* and thus suppresses a variation in rotation speed Ne of the engine 22, compared with the configuration that the converted power Pesh is set to the second correction power Pemo2 after the time t1 irrespective of the value of the converted power Pesh and the engine 22 is controlled by using a smaller power than the pre-correction requested power Pebase* by the sum of the first correction power Pemo1 and the second correction power Pemo2 as the post-correction requested power Pemo*.

The hybrid vehicle 20 of the above embodiment is configured that the target rotation speed Ne* of the engine 22 is set according to the requested power Pe*; the tentative torque Tm1tmp of the motor MG1 is set to rotate the engine 22 at the target rotation speed Ne*; and the engine 22 and the motor MG1 are controlled to cause the engine 22 to output a power based on the requested power Pe* and cause the motor MG1 to output a torque corresponding to the torque command Tm1*, which is obtained by limiting the tentative torque Tm1tmp with the torque limit Tlim1. After satisfaction of the overrun condition that the tentative torque Tm1tmp of the motor MG1 overruns the torque limit Tlim1, when the tentative torque Tm1tmp of the motor MG1 overruns the torque limit Tlim1 (i.e., when the converted power Pesh corresponding to the torque shortage Tm1sh of the torque limit Tlim1 relative to the tentative torque Tm1tmp is greater than the value 0), the converted power Pesh is set to the second correction power Pemo2. When the tentative torque Tm1tmp has a surplus relative to the torque limit Tlim1 (i.e., when the converted power Pesh is equal to or less than the value 0), on the other hand, the value 0 is set to the second correction power Pemo2. The engine 22 is controlled to output a smaller power than the pre-correction requested power Pebase* by the sum of the first correction power Pemo1 and the second correction power Pemo2. This more effectively suppresses a change in requested power Pe* and thus suppresses a variation in rotation speed Ne of the engine 22, compared with the configuration that the converted power Pesh is set to the second correction power Pemo2 irrespective of the value of the converted power Pesh. This also suppresses an excessive increase in rotation speed Nm1 of the motor MG1.

After satisfaction of the overrun condition, the hybrid vehicle 20 of the embodiment subtracts the tentative torque Tm1tmp of the motor MG1 from the torque limit Tlim1 of the motor MG1 to calculate the torque shortage Tm1sh, calculates the converted power Pesh using the calculated torque shortage Tm1sh, and sets the greater between the calculated converted power Pesh and the value 0 to the second correction power Pemo2. One modification may calculate the converted power Pesh using the greater between the torque shortage Tm1sh and the value 0 and set the calculated converted power Pesh to the second correction power Pesh.

Figure 8:
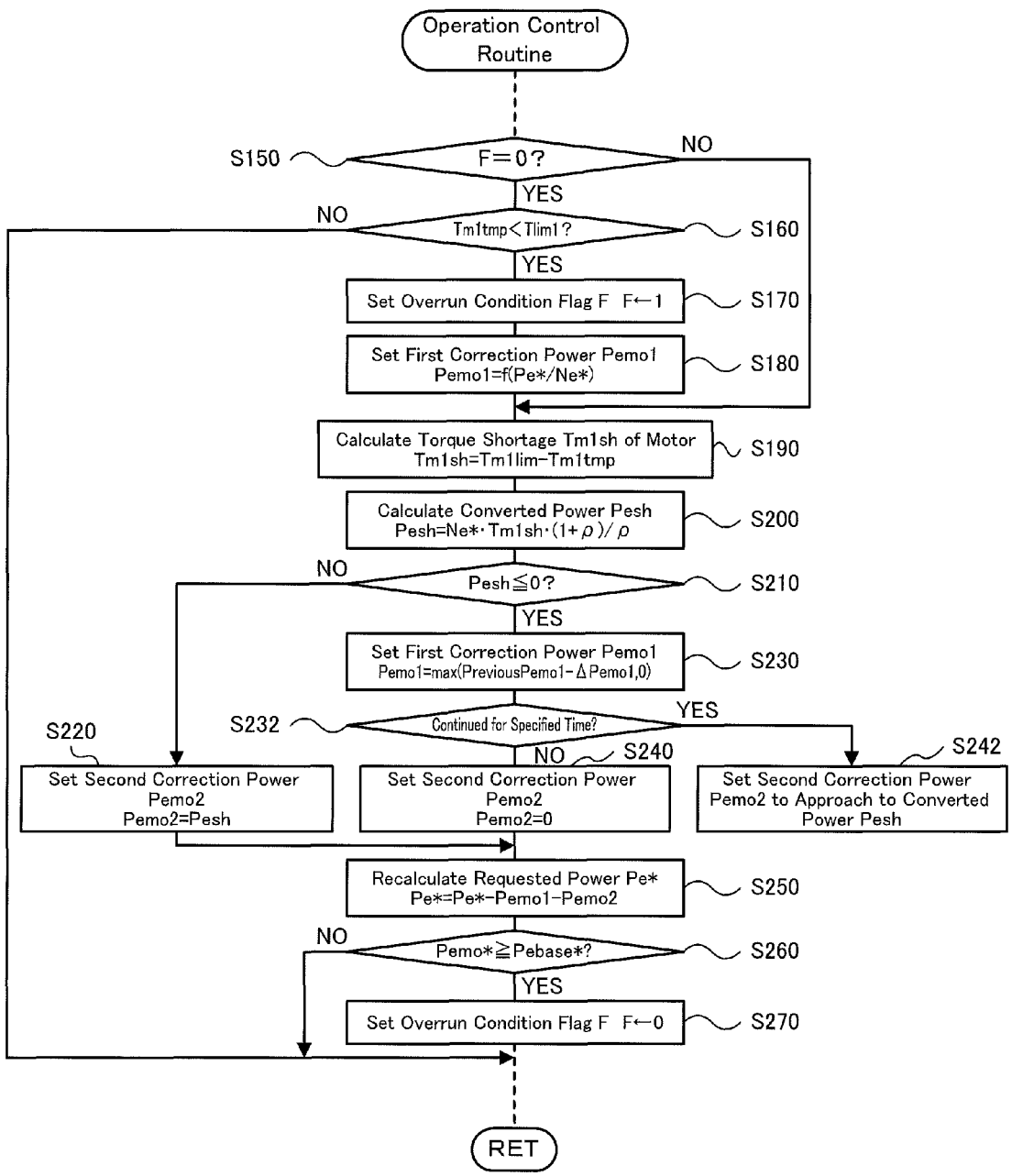
FIG. 8 is a flowchart showing part of an exemplary operation control routine according to a modification.

After satisfaction of the overrun condition, the hybrid vehicle 20 of the embodiment sets the converted power Pesh to the second correction power Pemo2 when the tentative torque Tm1tmp overruns the torque limit Tlim1 (i.e., when the converted power Pesh is greater than the value 0), while setting the value 0 to the second correction power Pemo2 when the tentative torque Tm1tmp has a surplus relative to the torque limit Tlim1 (i.e., when the converted power Pesh is equal to or less than the value 0). According to one modification, when the tentative torque Tm1tmp overruns the torque limit Tlim1, the converted power Pesh is set to the second correction power Pemo2. When the tentative torque Tm1tmp has a surplus relative to the torque limit Tlim1, on the other hand, the second correction power Pemo2 is set according to its duration. Part of an exemplary operation control routine according to this modification is shown in FIG. 8. The operation control routine of FIG. 8 is similar to the operation control routine of FIG. 2, except addition of the processing of steps S232 and S242. In the operation control routine of FIG. 8, when the converted power Pesh is greater than the value 0 at step S210, the modified procedure sets the converted power Pesh to the second correction power Pemo2 (step S220), subtracts the first correction power Pemo1 and the second correction power Pemo2 from the pre-correction requested power Pebase* to calculate the post-correction requested power Pemo* (step S250) and performs the processing of and after step S260. When the converted power Pesh is equal to or less than the value 0, on the other hand, the modified procedure sets the greater between the value 0 and the value obtained by subtracting the predetermined value ΔPemo1 from the previous first correction power (previous Pemo1) to the first correction power Pemo1 (step S230) and determines whether its duration that the converted power Pesh is equal to or less than the value 0 is equal to or longer than a specified time (step S232). When the duration is shorter than the specified time, the value 0 is set to the second correction power Pemo2 (step S240). When the duration is equal to or longer than the specified time, on the other hand, the second correction power Pemo2 is set to gradually approach from the value 0 to the converted power Pech (<0) by a gradual changing process such as rating process or smoothing process (step S242). The modified procedure subtracts the first correction power Pemo1 and the second correction power Pemo2 from the pre-correction requested power Pebase* to calculate the post-correction requested power Pemo* (step S250) and performs the processing of and after step S260. The specified time is used not to give the driver a feeling of strangeness due to a variation in rotation speed Ne of the engine 22 and may be, for example, 500 msec, 700 msec or 1000 msec to set the variable period of the rotation speed Ne of the engine 22 in a range of about 500 msec to 1000 msec. During continuation of the state that the tentative torque Tm1tmp has a surplus relative to the torque limit Tlim1 (i.e., the state that the converted power Pesh is less than the value 0), such control makes the second correction power Pemo2 smoothly close to the converted power Pesh and makes the post-correction requested power Pemo* smoothly close to the pre-correction requested power Pebase*. This shortens the time before the setting of the overrun condition flag F is changed over from the value 1 to the value 0, compared with the embodiment.

After satisfaction of the overrun condition, this modification subtracts the tentative torque Tm1tmp of the motor MG1 from the torque limit Tlim1 of the motor MG1 to calculate the torque shortage Tm1sh, and calculates the converted power Pesh using the calculated torque shortage Tm1sh. When the calculated converted power Pesh is greater than the value 0, the modification sets the converted power Pesh to the second correction power Pemo2. When the converted power Pesh is equal to or less than the value 0 and when its duration is shorter than the specified time, the modification sets the value 0 to the second correction power Pemo2. When the converted power Pesh is equal to or less than the value 0 and when its duration is equal to or longer than the specified time, the modification sets the second correction power Pemo2 to gradually approach from the value 0 to the converted power Pesh. When the torque shortage Tm1sh is greater than the value 0, another modification may calculate the converted power Pesh using the torque shortage Tm1sh and set the calculated converted power Pesh to the second correction power Pemo2. When the torque shortage Tm1sh is equal to or less than the value 0 and when its duration is shorter than a specified time, this modification may calculate the converted power Pesh using the value 0 instead of the torque shortage Tm1sh and set the calculated converted power Pesh to the second correction power Pemo2. When the torque shortage Tm1sh is equal to or less than the value 0 and when its duration is equal to or longer than the specified time, this modification may calculate the converted power Pesh using a post-gradual change torque shortage Tm1shsmo, which gradually changes from the value 0 to the torque shortage Tm1sh, instead of the torque shortage Tm1sh and set the calculated converted power Pesh to the second correction power Pemo2.

The hybrid vehicle 20 of the embodiment sets the first correction power Pemo1 according to the target torque Te* (=Pe*/Ne*) of the engine 22 at the time when the overrun condition is satisfied and subsequently decreases the first correction power Pemo1 with continuation of the state that the converted power Pesh is equal to or less than the value 0. One modification may set the first correction power Pemo1 to a fixed value at the time when the overrun condition is satisfied and subsequently decreases the first correction power Pemo1 with continuation of the state that the converted power Pesh is equal to or less than the value 0. Another modification may set the first correction power Pemo1 to a value according to the target torque Te* at the time when the overrun condition is satisfied or a fixed value and subsequently may not change the first correction power Pemo1 (may keep the first correction power Pemo1 unchanged). In this modification, the setting of the overrun condition flag F may be changed over from the value 1 to the value 0 when the ignition switch is off or when the gearshift position SP is changed to a non-drive position (parking position or neutral position).

Figure 9:
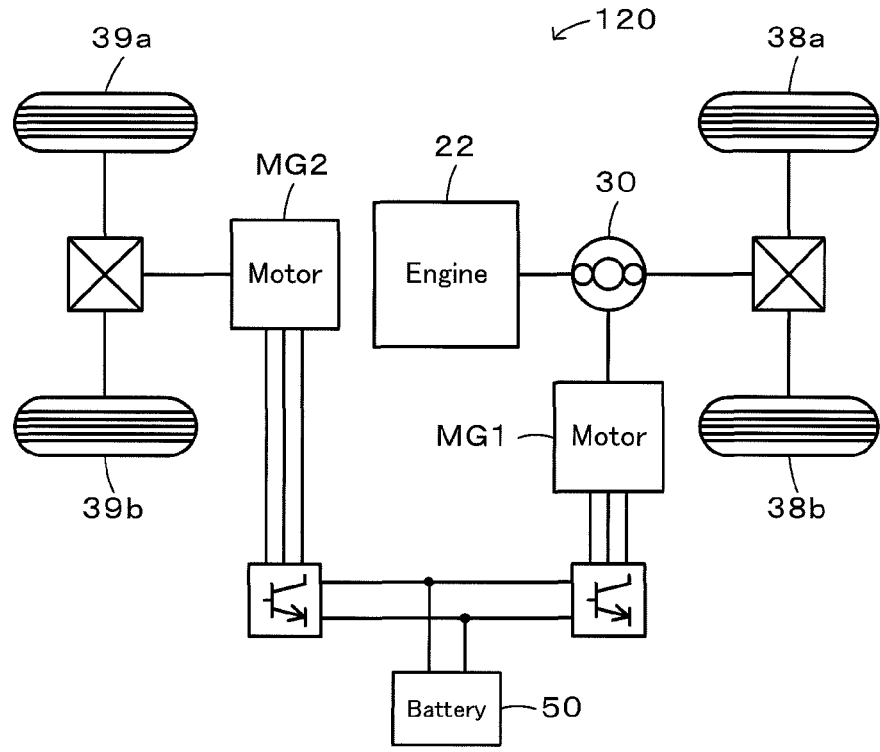
FIG. 9 schematically illustrates the configuration of another hybrid vehicle 120 in one modified example.

In the hybrid vehicle 20 of the embodiment, the power from the motor MG2 is output to the driveshaft 36. As illustrated in a hybrid vehicle 120 according to a modification of FIG. 9, the power from the motor MG2 may be linked to a different axle (axle connected with wheels 39a and 39b in FIG. 9) from an axle connected with the driveshaft 36 (axle connected with drive wheels 38a and 38b).

Figure 10:
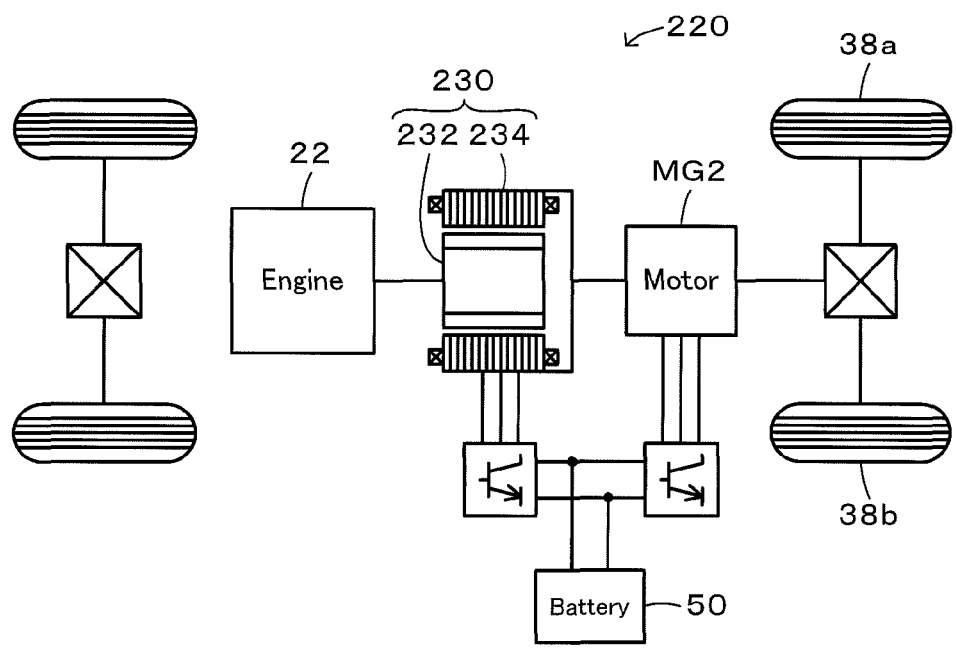
FIG. 10 schematically illustrates the configuration of still another hybrid vehicle 220 in another modified example.

The hybrid vehicle 20 of the embodiment is configured to output the power from the engine 22 via the planetary gear 30 to the driveshaft 36 connected with the drive wheels 38a and 38b. As illustrated in FIG. 10, a hybrid vehicle 220 of a modification may be equipped with a pair-rotor motor 230 that has an inner rotor 232 connected with a crankshaft of an engine 22 and an outer rotor 234 connected with the driveshaft 36 to output power to drive wheels 38a and 38b and transmits part of the power from the engine 22 to the driveshaft 36 while converting the remaining power into electric power.

Figure 11:
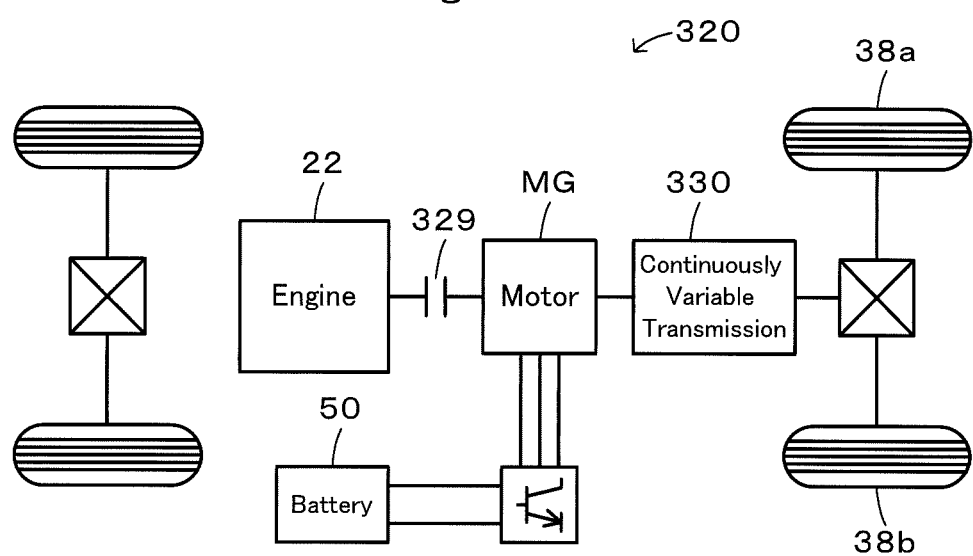
FIG. 11 schematically illustrates the configuration of still another hybrid vehicle 320 in another modified example.

In the hybrid vehicle 20 of the embodiment, the power from the engine 22 is output via the planetary gear 30 to the driveshaft 36 connected with the drive wheels 38a and 38b, while the power from the motor MG2 is output to the driveshaft 36. As illustrated in a hybrid vehicle 320 according to a modification of FIG. 11 configured that a motor MG is attached to a driveshaft 36 connected with drive wheels 38a and 38b via a continuously variable transmission 330 and that an engine 22 is connected with a rotating shaft of the motor MG via a clutch 329, the power from the engine 22 may be output to the driveshaft 36 via the rotating shaft of the motor MG and the continuously variable transmission 330, while the power from the motor MG may be output to the driveshaft 36 via the continuously variable transmission 330.

The following describes the correspondence relationship between the primary components of the embodiment and the primary components of the invention described in Summary of Invention. The engine 22 of the embodiment corresponds to the "engine"; the motor MG1 corresponds to the "motor"; the battery 50 corresponds to the "battery"; and the combination of the HVECU 70 performing the operation control routine of FIG. 2, the engine ECU 24 controlling the engine 22 and the motor ECU 40 controlling the motor MG1 corresponds to the "controller".

The engine 22 is not limited to the engine 22 that outputs power using a fuel such as gasoline or light oil but may be any type of engine that is capable of outputting a power for driving, such as a hydrogen engine. The "motor" is not limited to the motor MG1 provided as a synchronous motor generator but may be any type of motor that is capable of inputting and outputting a power from and to an output shaft of the engine. The "battery" is not limited to the battery 50 provided as a lithium ion secondary battery but may be any type of battery that is capable of transmitting an electric power to and from the motor, such as a nickel hydride battery, a nickel cadmium battery or a lead acid battery. The "controller" is not limited to the combination of the HVECU 70, the engine ECU 24 and the motor ECU 40 but may be provided by a single electronic control unit. The "controller" is not limited to the configuration that the target rotation speed Ne* of the engine 22 is set according to the requested power Pe*; the tentative torque Tm1tmp of the motor MG1 is set to rotate the engine 22 at the target rotation speed Ne*; and the engine 22 and the motor MG1 are controlled to cause the engine 22 to output a power based on the requested power Pe* and cause the motor MG1 to output a torque corresponding to the torque command Tm1*, which is obtained by limiting the tentative torque Tm1tmp with the torque limit Tlim1. In this configuration, after satisfaction of the overrun condition that the tentative torque Tm1tmp of the motor MG1 overruns the torque limit Tlim1, when the tentative torque Tm1tmp of the motor MG1 overruns the torque limit Tlim1 (i.e., when the converted power Pesh corresponding to the torque shortage Tm1sh of the torque limit Tlim1 relative to the tentative torque Tm1tmp is greater than the value 0), the converted power Pesh is set to the second correction power Pemo2. When the tentative torque Tm1tmp has a surplus relative to the torque limit Tlim1 (i.e., when the converted power Pesh is equal to or less than the value 0), on the other hand, the value 0 is to the second correction power Pemo2. The engine 22 is controlled to output a smaller power than the pre-correction requested power Pebase* by the sum of the first correction power Pemo1 and the second correction power Pemo2. The "controller" may, however, have any configuration that a target rotation speed of the engine is set according to a requested power that is needed to the vehicle; a rotation-adjusting torque is set to rotate the engine at the target rotation speed; and the engine and the motor are controlled to cause the engine to output a power based on the requested power and cause the motor to output a torque obtained by limiting the rotation-adjusting torque with a torque limit. In this configuration, after satisfaction of an overrun condition that the rotation-adjusting torque overruns the torque limit, in an overrun state that the rotation-adjusting torque overruns the torque limit, the engine may be controlled to output a smaller power than the requested power by the sum of a first power and a second power, which corresponds to a shortage of the torque limit relative to the rotation-adjusting torque. In a non-overrun state that the rotation-adjusting torque does not overrun the torque limit, on the other hand, the engine may be controlled to output a smaller power than the requested power by the first power.

The correspondence relationship between the primary components of the embodiment and the primary components of the invention, regarding which the problem is described in Summary of Invention, should not be considered to limit the components of the invention, regarding which the problem is described in Summary of Invention, since the embodiment is only illustrative to specifically describes the aspects of the invention, regarding which the problem is described in Summary of Invention. In other words, the invention, regarding which the problem is described in Summary of Invention, should be interpreted on the basis of the description in the Summary of Invention, and the embodiment is only a specific example of the invention, regarding which the problem is described in Summary of Invention.

The aspect of the invention is described above with reference to the embodiment. The invention is, however, not limited to the above embodiment but various modifications and variations may be made to the embodiment without departing from the scope of the invention.

INDUSTRIAL APPLICABILITY

The prevent invention is applicable in, for example, manufacturing industries of hybrid vehicles.

The invention claimed is:

1. A hybrid vehicle having: an engine that is capable of outputting a power for driving; a motor that is capable of inputting and outputting a power from and to an output shaft of the engine; and a battery that is capable of transmitting an electric power to and from the motor, the hybrid vehicle comprising:
 a controller that sets a target rotation speed of the engine according to a requested power that is needed to the vehicle, sets a rotation-adjusting torque to rotate the engine at the target rotation speed, and controls the engine and the motor to cause the engine to output a power based on the requested power and cause the motor to output a torque obtained by limiting the rotation-adjusting torque with a torque limit, wherein
 after satisfaction of an overrun condition that the rotation-adjusting torque overruns the torque limit, the controller controls the engine to output a smaller power than the requested power by a sum of a first power and a second power, which corresponds to a shortage of the torque limit relative to the rotation-adjusting torque, in an overrun state that the rotation-adjusting torque overruns the torque limit; and the controller controls the engine to output a smaller power than the requested power by the first power in a non-overrun state that the rotation-adjusting torque does not overrun the torque limit.

2. The hybrid vehicle according to claim 1, wherein
 after satisfaction of the overrun condition, in the non-overrun state, the controller controls the engine to output the smaller power than the requested power by the first power, before continuation of the non-overrun state for a specified time; and the controller controls the engine to make an output power of the engine approach from the smaller power than the requested power by the first power to a smaller power than the requested power by a power corresponding to a surplus of the rotation-adjusting torque relative to the torque limit, after continuation of the non-overrun state for the specified time.

3. The hybrid vehicle according to claim 2, wherein
 the first power decreases with continuation of the non-overrun state, after satisfaction of the overrun condition.

4. The hybrid vehicle according to claim 1, wherein
 the first power is likely to increase with an increase in value obtained by dividing the requested power at a time when the overrun condition is satisfied by the target rotation speed at the time when the overrun condition is satisfied.

5. The hybrid vehicle according to claim 1, further comprising:
 a planetary gear connected with the output shaft of the engine, a rotating shaft of the motor and a driveshaft linked to an axle; and
 a second motor that is capable of transmitting an electric power to and from the battery and has a rotating shaft connected with the driveshaft.

* * * * *